United States Patent [19]
Ort

[11] Patent Number: 5,630,005
[45] Date of Patent: May 13, 1997

[54] METHOD FOR SEEKING TO A REQUESTED LOCATION WITHIN VARIABLE DATA RATE RECORDED INFORMATION

[75] Inventor: Jeffrey Ort, Kirkland, Wash.

[73] Assignee: Cirrus Logic, Inc. Fremont, Calif.

[21] Appl. No.: 620,984

[22] Filed: Mar. 22, 1996

[51] Int. Cl.$^6$ .................. H04N 5/76; H04N 5/92
[52] U.S. Cl. .................. 386/69; 386/70; 386/111
[58] Field of Search .................. 386/1, 45, 46, 386/69, 70, 33, 125, 126, 109, 111, 112; 360/71, 72.1, 72.2, 78.01, 78.02, 78.04, 78.07, 78.08, 8; 369/32, 44.28; H04N 5/91, 5/92

[56] References Cited

U.S. PATENT DOCUMENTS

| | | | |
|---|---|---|---|
| 4,774,699 | 9/1988 | Giddings | 386/125 |
| 5,063,550 | 11/1991 | Watari et al. | 386/125 |
| 5,070,419 | 12/1991 | Kiyonaga | 386/124 |
| 5,218,450 | 6/1993 | Nagai et al. | 386/70 |
| 5,218,453 | 6/1993 | Hashimoto | 386/126 |
| 5,479,303 | 12/1995 | Suzuki et al. | 386/70 |
| 5,497,240 | 3/1996 | Yoo | 386/69 |
| 5,510,899 | 4/1996 | Kim | 386/69 |

*Primary Examiner*—Thai Tran
*Attorney, Agent, or Firm*—Wagner, Murabito & Hao

[57] ABSTRACT

A method for causing a computer controlled digital playback system to seek to a requested location within a selected playback file recorded in variable data rate encoding format (e.g., MPEG). The playback file is stored in a suitable recording media. The novel method receives a seek command to a requested playback time referenced by a time unit (e.g., seconds) or a frame number and also accesses an upper rate bound from a system header. The rate bound indicates the maximum data rate of the encoded data in the playback file. Using the rate bound and the requested playback time, an approximate location is determined in the playback file and the playback file is seeked to that approximate location. The method reads a first available time stamp near the approximate location and checks if the discovered time stamp matches with the requested playback time within a predetermined degree. If not, the novel method computes an adjusted data rate based on the discovered time stamp and the approximate location. This adjusted data rate is averaged with the prior data rate to obtain a current data rate used to compute a new approximate location. The above is repeated until a match occurs or until the new approximate location equals the old approximate location. Upon a match, an I frame or a sequence header is located, initialization information is pre-pended, the video processor unit is flushed, and the playback file data is downloaded for playback beginning at the requested playback time.

20 Claims, 7 Drawing Sheets

400

```
         ┌─────────────┐
         │    ENTER    │
         └──────┬──────┘
                ▼
    ┌───────────────────────────┐
    │  INPUT SEEK-TO PARAMETER FOR │
    │  CURRENT AUDIO/VIDEO FILE  │
    │                        410 │
    └──────────────┬─────────────┘
                   ▼
    ┌───────────────────────────┐
    │  CONVERT SEEK-TO PARAMETER TO │
    │  MPEG STD FORMAT IN TIME   │
    │                        420 │
    └──────────────┬─────────────┘
                   ▼
    ┌───────────────────────────┐
    │   ACCESS RATE_BOUND FROM   │
    │      SYSTEM HEADER         │
    │                        430 │
    └──────────────┬─────────────┘
                   ▼
    ┌───────────────────────────┐
    │  DETERMINE APPROXIMATE BYTE │
    │  LOCATION BASED ON RATE_BOUND │
    │      AND SEEK-TO TIME      │
    │                        440 │
    └──────────────┬─────────────┘
                   ▼
    ┌───────────────────────────┐
    │  SEEK TO APPROXIMATE BYTE  │
    │   LOCATION IN CURRENT      │
    │     AUDIO/VIDEO FILE       │
    │                        450 │
    └──────────────┬─────────────┘
                   ▼
                 ( A )
```

FIG. 4

METHOD FOR SEEKING TO A REQUESTED LOCATION WITHIN VARIABLE DATA RATE RECORDED INFORMATION

FIELD OF THE INVENTION

The present invention relates to the field audio and video playback systems. More specifically, the present invention relates to computer controlled audio and video playback systems that utilize variable data rate formatted digital audio and video signals.

BACKGROUND OF THE INVENTION

Recent developments in computer technology have increased the storage capacity of media storage devices (e.g., hard disks, CD-ROMs, etc.) and have simultaneously increased the volatile memory storage capacity and data processing speeds of computer systems. These developments have facilitated using computer systems for processing and playback of signals representing motion pictures with associated sound recordings and other audio/visual multimedia works. To meet the demand for playing back audio/visual works in digital format, the Motion Picture Expert Group or MPEG format was developed. The MPEG format, as described in international specifications ISO/IEC 11172-1 to ISO/IEC 11172-3, et seq., provides data compression, decompression and data encoding and decoding techniques for digital audio and video signals to facilitate their storage, transmission and reproduction on computer systems. The MPEG format supplies the digital audio and video signals using a constant frame rate but a variable data rate. Specifically, the MPEG format offers an effective mechanism for intelligently compressing and decompressing digital video and audio signals and providing the decompressed signals to a playback mechanism for viewing.

In the past, recording formats for digital audio and video interleaved (e.g., AVI) data signals recorded data with a constant data rate and therefore a constant frame rate. In these systems, each frame of data contains the same amount of information and each transmission time interval also contains the same amount of information. In the prior art, there is a one-to-one correspondence between the number of bytes of a segment of an audio/video file and the playback duration for that segment. Therefore, seeking to a particular location (e.g., identified by a frame number or a time reference) of an audio/video file is relatively simple in a constant data rate format. As a result, these prior art video and audio display formats, due to the above characteristics, did not pose any special problems when seeking to a particular reference time or frame number within the audio/video file.

However, the MPEG format encodes the audio and video digital signals in an intelligent manner using variable data rates. During audio/video data encoding and recording, MPEG data is compressed using different frame types. Routinely, in lieu of storing all data within a conventional video frame, MPEG encodes and records only those parts of sequential frames that are altered from frame to frame (among other techniques) in an effort to compress the data. In the recorded data, the number of bytes representing a frame varies from frame to frame in MPEG, however, the frame update rate is constant during playback. What results is a variable data rate recording format where one frame of data (e.g., 1/40 of a second of playback time) can be represented by x bytes while a subsequent frame of data (e.g. another 1/40 of a second of playback time) is represented by only 5% of x bytes. The use of a variable data rate recording format poses problems when seeking through an audio/video file to a requested playback time (referenced by time in milliseconds or frame number) because MPEG does not use the same number of data bytes to represent each playback interval (e.g., a frame).

In order to perform seeks through an MPEG audio/video file to a particular playback location, prior art systems have resorted to parsing through the entire audio/video file until the requested playback time or frame number is encountered within the encoded data. This is method of seeking takes a substantial amount of time to complete and requires a significant amount of processing resources to parse the MPEG data looking for the requested playback time or frame number. This prior art technique is not desirable because these processing resources should be performing other more useful tasks.

Accordingly, it is desired to provide a playback system (e.g., a computer system or dedicated computer controlled digital playback system) with the ability to efficiently and effectively locate a requested playback time or frame number within an audio/video file that is recorded within a variable data rate recording format. It is further desired to provide a playback system as described above for providing efficient seeking capabilities within audio/video files recorded in the MPEG format.

SUMMARY OF THE INVENTION

The present invention includes a method for causing a computer system or other computer controlled digital playback system to seek to a requested playback location referenced by a playback time or a frame number within a selected audio/video file that is recorded in variable data rate recording format (e.g., MPEG). The audio/video file is stored in a suitable recording media, such as CD-ROM storage, magnetic disk storage, computer memory storage, etc. The method receives a requested playback location referenced by a playback time or frame number and also accesses an upper rate bound from a system header of the playback file. The rate bound information indicates the maximum data rate of the recorded data in the playback file. By multiplying the rate bound and the requested playback time, an approximate byte location is determined and the playback file is seeked to that approximate byte location. The method reads a time stamp near the approximate location and checks if the discovered time stamp matches with the requested playback time to within some predetermined degree. If not, the novel method computes an adjusted data rate based on the discovered time stamp and the approximate location. This adjusted data rate is averaged with the prior data rate to obtain a current data rate used, with the requested playback time, to compute a new approximate location. The new approximate location is then seeked to, another time stamp is located, and another check is determined against the requested playback time. The above is repeated until a match occurs or until the new approximate location equals the old approximate location. Upon a match, an I frame or a sequence header is located, initialization information is pre-pended, a video processor unit is flushed, and the playback file data is downloaded for viewing.

Specifically, in a digital playback system including a video processor unit, embodiments of the present invention include a method of seeking to a requested playback time within an audio/video file, the method comprising the steps of: (a) identifying a data rate associated with the audio/video by locating a maximum data rate value stored in the audio/video file, the audio/video file recorded in a variable data rate format; (b) determining an approximate location within the audio/video file based on the data rate and the requested playback time; (c) identifying an intended playback time stored within data of the audio/video file located near the approximate location; (d) if the intended playback time does not match the requested playback time, adjusting the approximate location based on the intended playback time; (e) repeating steps (c) and (d) until the intended playback time matches the requested playback time.

Embodiments include the above and wherein the step (c) comprises the steps of: seeking within the audio/video file to a byte location identified by the approximate location; reading an amount of data of the audio/video file near the byte location into a buffer; and searching the buffer to locate a time stamp, wherein the time stamp indicates the intended playback time associated with the approximate location.

Embodiments include the above and wherein the step of (d) comprises the steps of: (1) comparing the intended playback time with the requested playback time; and (2) if the step of comparing does not indicate a match: (i) adjusting the data rate based on the intended playback time and the approximate location; and (ii) updating the approximate location based on the requested playback time and the data rate as adjusted above and wherein the step (i) comprises the steps of: determining a new data rate based on the intended playback time and the approximate location; averaging the data rate and the new data rate to arrive at an averaged data rate; and referencing the data rate to the averaged data rate. Embodiments also include a computer system implemented in accordance with the above.

BRIEF DESCRIPTION OF THE DRAWINGS

FIG. 4 is a flow diagram illustrating initial steps of the seek procedure of the present invention.

DESCRIPTION OF THE PREFERRED EMBODIMENTS

Figure 1:
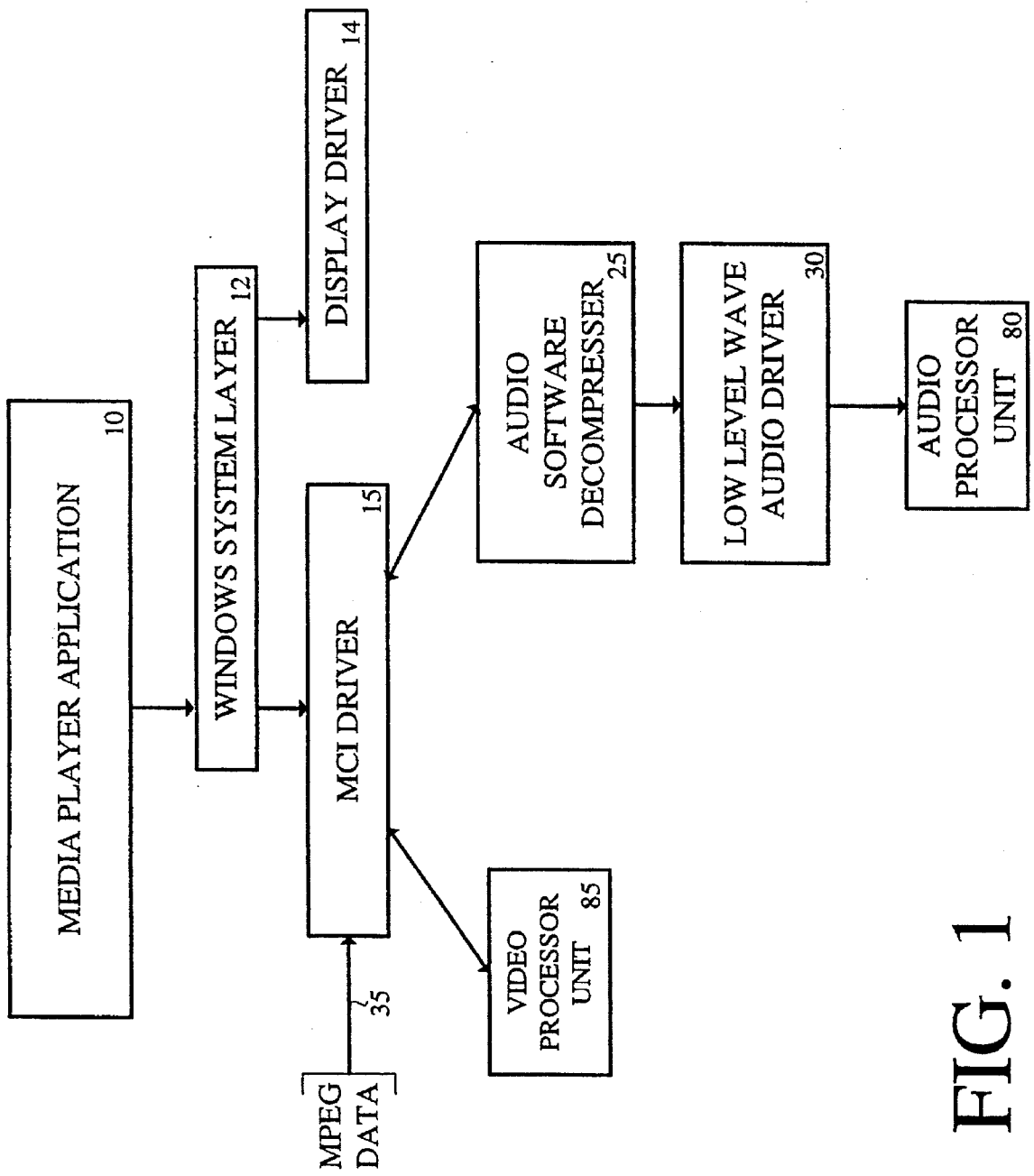
FIG. 1 is a diagram illustrating the logical layers of hardware and software within the environment of the seek procedure of the present invention.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

The present invention includes a method for seeking to a requested playback time within an audio/video file that is recorded in a variable data rate format (e.g., MPEG). The method of the present invention (e.g., process 400 commencing on FIG. 4) is operable within a system environment (e.g., system 40 of FIG. 1) including a computer system or other computer controlled digital playback system (e.g., system 50 of FIG. 2). The computer system 50 includes a video processor unit (e.g., unit 85 of FIG. 3). These elements, along with the method of the present invention, are described below.

SYSTEM OVERVIEW

FIG. 1 shows a system overview 40 of an hardware/software environment of the present invention including different logical control levels. Media player application 10 (application 10) is a software procedure executable within a computer system or dedicated digital playback system (hereinafter referred to as playback system 50, described in more detail with reference to FIG. 2). Application 10 of FIG. 1 typically interfaces with a user which selects a particular audio/video file (e.g., a motion picture with sound) to be played on the playback system 50. In the playback system 50, audio signals are sent to a sound generation device (e.g., a speaker) and video signals are rendered on a display screen. In accordance with the present invention, application 10 can be of a number of well known media player applications.

Application 10 interfaces with and controls, e.g., via software calls, a low level driver 15 which is a lower level software program to application 10. This control is asserted through a system layer 12 interface (e.g., in one embodiment a Windows system layer 12). The system layer 12 also communicates with a display driver 14, which is not particularly pertinent to the present invention. Within the present invention, application 10 issues commands to the MCI driver 15 requesting playback of a selected audio/video file beginning at a requested playback time. In one embodiment, the low level driver 15 is an MCI type driver. The MCI driver 15 of the present invention contains low level function calls to the hardware units (e.g., video processor unit 85 and audio processor unit 80) and to other lower level software routines (e.g., audio software decompresser 25) to control the playback of the selected audio/video file. The specific routines (process 400) within the MCI driver 15 that perform seeking functions in accordance with the present invention will be described further below. The MCI driver 15 opens filenames (e.g. representative of an audio/video file) that are supplied by application 10. MCI driver 15 also reads in the selected audio/video file from its source (e.g. source 105 FIG. 2) and performs any required initialization of the playback system 50 to play the selected audio/video file.

Application 10 and MCI driver 15 process audio and visual digital data within an MPEG format (the MPEG data) which is defined specifications ISO/IEC 11172-1 to ISO/IEC 11172-3, et seq. (1993). However, as will be evident from the seeking procedures 400 of the present invention, the present invention is equally suited for use with other variable data rate recording formats in addition to the MPEG recording format. As shown in FIG. 1, encoded MPEG data representative of the audio/video file is received over line 35, from an MPEG source 105 (FIG. 2), to the MCI driver 15. Alternatively, the MPEG data can also be directly supplied to application 10 which then transfers the MPEG data to MCI driver 15. Either implementation is considered within the scope of the present invention.

The MPEG audio and video data is formatted according to the above referenced MPEG specification. As is known, the digital audio and video MPEG data arrives from separate source (e.g., it is not interleaved) and does not arrive in playback order. Although MPEG data is displayed within a constant frame rate, it is recorded using a variable data rate whereby individual recorded frames do not contain a uniform amount of data.

The MCI driver 15 of the present invention, via software function calls, controls the processing of video MPEG data. MCI driver 15 controls a video processor unit 85 by reading and writing data to control registers and responding to interrupt signals originated by the video processor unit 85. This video processor unit 85 is described in more detail with reference to FIG. 3. The MCI driver 15 also controls processing of audio MPEG data by controlling a low level audio software decompresser 25. Audio software decompresser 25 can be one of a number of well known software routines that are executable within the playback system 50. Audio software decompresser 25 decompresses audio MPEG data in accordance with the above referenced MPEG specifications.

Audio software decompresser 25 controls and supplies decompressed audio signals to a low level wave audio driver 30 that is also executable within the playback system 50. A number of well known MCI or Microsoft based wave audio drivers can be used in accordance with the present invention as driver 30. Low level wave audio driver 30 controls the presentation of audio signals (e.g., typically digital) to an audio processor unit 80. Audio processor unit 80 is a hardware sound generation device and typically is implemented as a plug-in circuit board to the playback system 50.

In accordance with the present invention, several well known sound generation devices, such as a Sound Blaster™ products, Microsoft Sound™ products, Media Vision™ products, and similar products can be used as the audio processor unit 80. An audio time counter (e.g., 33 bit value at 90 kHz) is maintained by the above audio elements.

PLAYBACK SYSTEM 50

Figure 2:
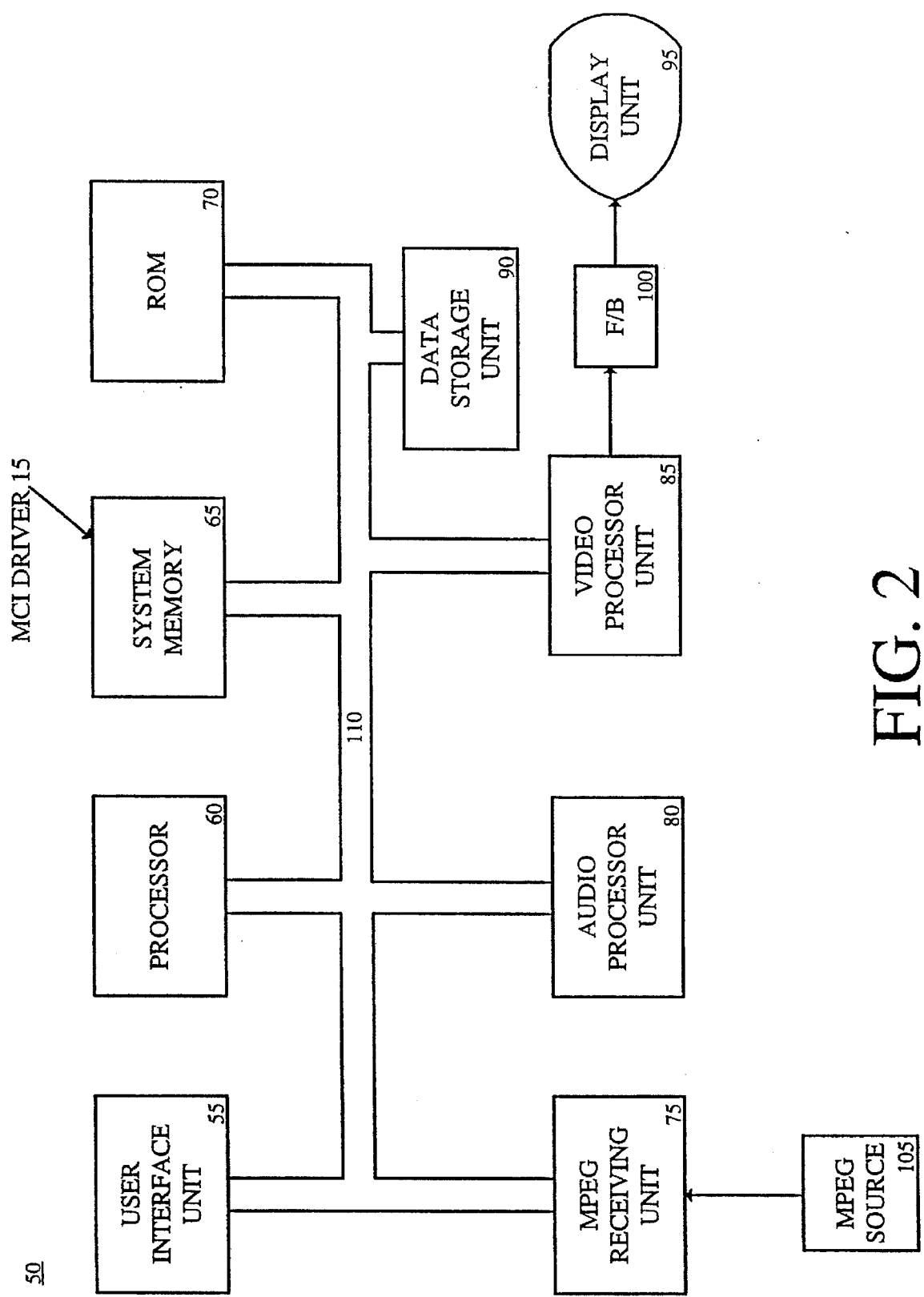
FIG. 2 is a logical hardware diagram illustrating an exemplary hardware platform of the present invention.

FIG. 2 illustrates a hardware block diagram of the playback system 50 as discussed above. The playback system 50 can be based on a computer system platform or can be based on a computer controlled dedicated digital audio/visual playback system. Play back system 50 contains an address/data bus 110 for carrying digital address and data signals. A processor 60 (e.g., a central processing unit) for executing instructions and processing data is connected to the address/data bus 110 as well as a system memory 65 which includes computer readable volatile memory (e.g., RAM); memory system 65 can be used for storing program code information (e.g., process 400) and MPEG data. A computer readable non-volatile memory unit (e.g., ROM) 70 is also coupled to address/data bus 110 and can be used for storing program information. An optional data storage device 90 (e.g., a disk drive, CD-ROM drive, or other optical drive) can be coupled to address/data bus 110. Optionally, a user interface unit 55 (e.g., including a keyboard and a cursor directing device) can be coupled to address/data bus 110.

In one embodiment, process 400 of the MCI driver 15 of the present invention is located within memory addressable by playback system 50 (e.g., system memory 65) and is executed by processor 60.

FIG. 2 also includes hardware units for processing audio/video MPEG data. An MPEG source 105 and an MPEG receiving unit 75 are used to store and receive the MPEG data into the playback system 50. The MPEG receiving unit 75 (e.g., a modem, a CD-ROM hardware controller unit, or a disk drive hardware controller unit, etc.) is coupled to address/data bus 110 for receiving MPEG data from the MPEG source 105. The MPEG source 105 can include a CD-ROM device, a disk drive device, a computer network (e.g., the internet) or any other digital signal storage medium. Also coupled to address/bus 110 is the audio processor unit 80 and the video processor unit 85. The video processor 85 is also coupled to a frame buffer (F/B) unit 100 which typically contains volatile memory referred to as video memory. The F/B unit 100 is cyclically read by well known raster update circuitry to generate an analog or digital video output signal to a display unit 95 which can be CRT or flat panel based.

It is appreciated that in alternative embodiments, both audio and video MPEG data are sent to input buffers of the video processor unit 85; the video processor unit 85 then parsing out the audio video data and forwarding same to the audio software decompresser 25.

VIDEO PROCESSOR UNIT 85

Figure 3:
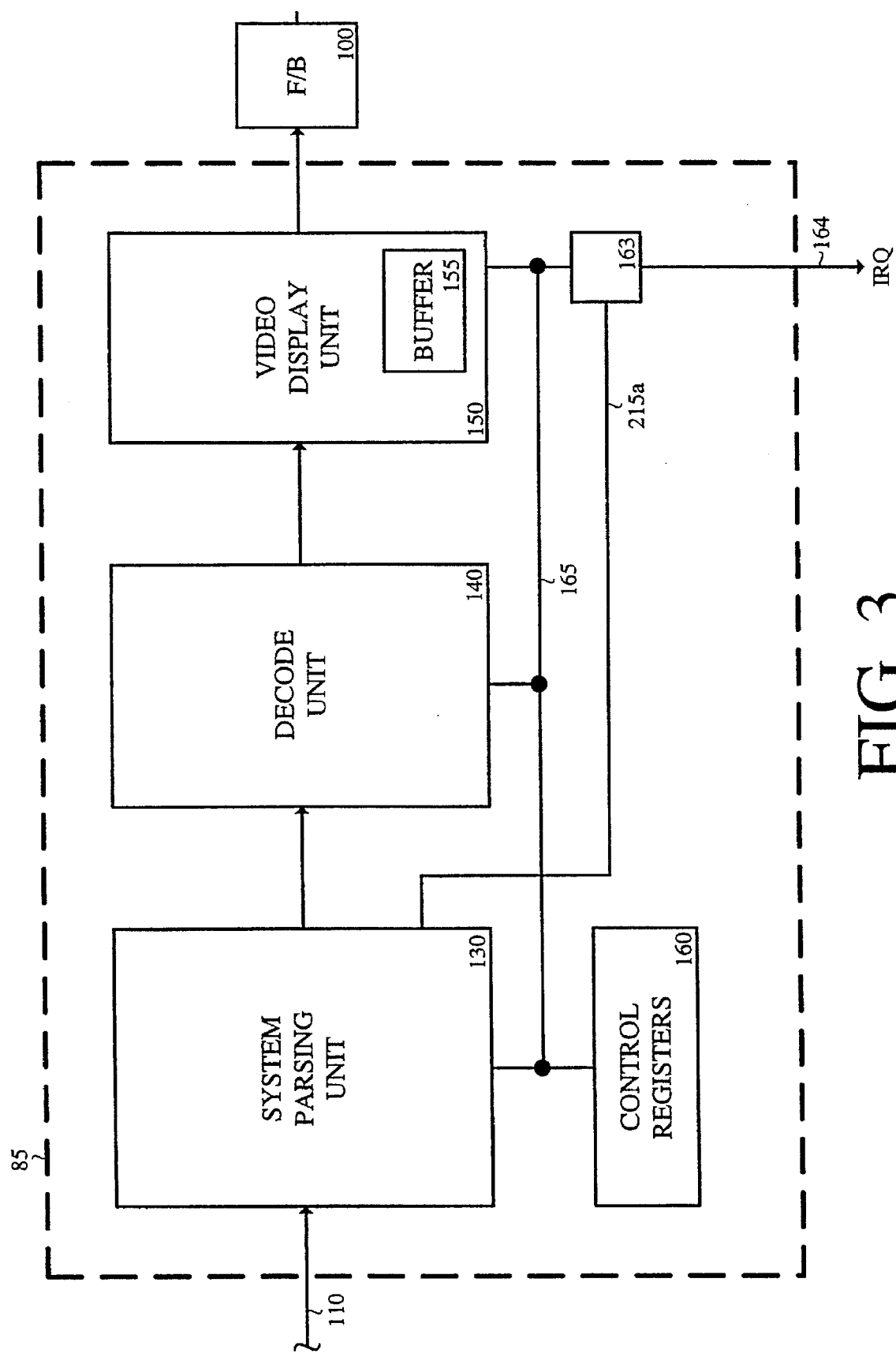
FIG. 3 is a logical block diagram illustrating hardware components of the video processor unit in accordance with the present invention.

FIG. 3 illustrates components of the video processor unit 85 used by the present invention. The video processor unit 85 is a hardware circuit that receives encoded MPEG data from a MPEG source 105 and decodes the data for playback on display unit 95. MCI driver 15 controls the supply of MPEG data to the video processor unit 85. Specifically, the video processor unit 85 signals the MCI driver 15 with threshold low interrupt signals to cause the MCI driver 15 to control MPEG information flow to the video processor unit 85.

In one exemplary implementation, the 5518 chip device supplied by Cirrus Logic of California can be used as the video processor unit 85. Video processor unit 85 contains a system parsing unit 130 which contains a buffer memory for receiving digital video MPEG data (which in one embodiment is supplied over address/bus 110). The system parsing unit 130 contains circuitry for interrogating compressed MPEG data packets to locate and identify video frames and their frame type (e.g., B, P or I class as defined by the above referenced MPEG specifications) as they are input over bus 110. The system parsing unit 130 also interrogates the compressed video MPEG data to determine the video presentation time stamp (time stamp) for each video MPEG data packet. The time stamp, as is known in the MPEG format, is a 33 bit binary number (based on a 90 kHz clock) and represents the intended presentation time for a video frame.

The system parsing unit 130 outputs a compressed video MPEG signal to a decode unit 140 which contains circuitry for (1) decompressing and (2) decoding the input compressed video MPEG signal. The decompression and decoding functions performed by the decode unit 140 are in accordance with the MPEG specifications as referenced above. Decode unit 140 reconstructs presentation units (e.g., pictures) from compressed data and forwards them in a synchronized sequence according to their presentation times. The decode unit 140 outputs a decoded and decompressed video MPEG signal to a video display unit 150. The video frames output by the decode unit 140 are in playback sequence and are supplied at a constant frame rate. The video display unit 150 contains a relatively limited size data buffer 155 (e.g., a 3 to 4 frames in size) and is used to transfer the decompressed and decoded video frames to the F/B unit 100 for rendering on the display unit 95 (see FIG. 2).

The video processor unit 85 of FIG. 3 of the present invention also contains a set of control registers 160 which contain memory locations (e.g., bits or bytes) for controlling the video processor unit 85. One memory (e.g., register) location is for storing a video processor flush command. Other memory cells are for storing a frame pause indicator and a frame skip indicator. Control register 160 also contains a video time counter (e.g., 33 at 90 kHz) representative of the video frame display. Control register 160 is coupled to system parsing unit 130, decode unit 140 and the video display unit 150 via control bus 165. A control and interrupt generation (CIG) circuit 163 is also coupled to control bus 165. CIG circuit 163 is also coupled to system parsing unit 130 via line 215a. CIG circuit 163 generates an interrupt request over line 164 to processor 60 (FIG. 2) of the playback system 50 to interrupt MCI driver 15 and performs other control features described below. One such interrupt informs the MCI driver 15 when the internal input buffers of the video processor 85 are empty or near empty as specified by the control registers 160.

The video processor unit 85 is able to recover certain MPEG information stored within specific locations of MPEG defined data packets (as defined by the above referenced MPEG specification). Specifically, using well known techniques, the video processor unit 85 is able to locate a rate_bound parameter from an MPEG system_header, an audio or video packet header (e.g. within a packet layer), the start of an I frame and the start of a sequence header, and is able to locate a presentation_time_stamp ("time stampe") within a pack_start_code or within an audio or video packet header.

SEEK PROCEDURE 400 OF THE PRESENT INVENTION

With reference to FIG. 4, the initial steps of the seek procedure 400 of the present invention are illustrated. Procedure 400 provides an efficient and effective method of seeking to a requested playback time within an audio/video file that is recorded in a variable data rate format. As described above, procedure 400 is a computer implemented procedure and is operable within play back system 50 as part of the MCI driver 15. Specifically, procedure 400 is implemented in program code stored within a computer readable memory unit of system 50 (e.g., unit 65 and/or unit 70). Procedure 400 assumes that a user, or some other originator, selected a particular audio/video file and the MCI driver 15 accessed the audio/video file (e.g., opened the file) and performed any required software initiation.

Procedure 400 of FIG. 4 starts at step 410 where a "seek to" parameter is received (typically from a user). The "seek to" parameter specifies a requested playback time (of the audio/video file) that the user desires to have played back over the playback system 50. In one embodiment, the "seek to" parameter can be represented in units of frame numbers or can be represented in units of time (e.g., milliseconds), however, other units of time (e.g., seconds, minutes and hours) can also be used. Often, the "seek to" parameter is received as part of a seek command that is issued from the media player application 10 to the MCI driver 15. A number of command formats can be used, and an exemplary command format in accordance with step 410 is shown below:

_SEEK(File_Handle, "Seek to" Parameter)

Where File_Handle is the name or handle of the selected audio/video file (the playback file). In accordance with the present invention, the above referenced seek command is able to operate with a playback file recorded in a variable data rate format.

At step 420, the present invention converts the units of the "seek to" parameter into units (e.g., "ticks") of a 90 kHz clock which is an MPEG time format (e.g., 1 ms is 90 ticks while 1 sec is 90,000 ticks). An exemplary 33 bit binary number format is used to store the result of the conversion. At step 420, if the received "seek to" units are in seconds, then the present invention multiplies the seconds by 90,000 (e.g., 1 sec is equal to 90,000 ticks) to arrive at the corresponding MPEG time format. At step 420, if the received "seek to" units are in milliseconds, then the present invention multiplies the milliseconds by 90 to arrive at the corresponding MPEG time format. The MPEG frame rate, FR, is constant within a given audio/video file playback. The FR value is typically between 30 and 50 frames per second. At step 420, if the "seek to" units are given in frame numbers (FN) then the present invention utilizes the below relationship to arrive at the corresponding requested playback time in MPEG time format:

$$RTIME \ (MPEG \ Format) = [(FN/FR) \times 1,000] \times 90$$

Where RTIME is the requested playback time in MPEG time format corresponding to the "seek to" parameter. Assuming a frame rate (FR) of 40 frames per second and a frame number (FN) of 4,000, the above relationship gives (4,000/40)×1,000 or 100,000 ms. The requested playback time in MPEG time format is then 100,000×90 or 9 million ticks.

At step 430 of FIG. 4, the present invention accesses the rate_bound information from the system_header of the selected audio/video file. The system_header is defined in section 2.4.3.2 of the ISO/IEC 11172-1: (1993) specification and contains a number of defined fields (e.g., system_header_start_code, header_length, marker_bit, etc.), including the rate_bound field. The rate_bound field indicates the maximum data rate of the MPEG data recorded within the selected audio/video file. In one embodiment, the maximum data rate is expressed in bytes/second but can also be expressed in bits/second. Step 430 of the present invention can be performed using a number of well known methods and components.

Specifically, in one embodiment, the rate_bound is an integer value greater than or equal to the maximum value of the mux_rate field coded in any pack of the ISO/IEC 11172 multiplexed stream. The mux_rate is a positive integer specifying the rate at which the system target decoder receives the ISO/IEC 11172 multiplexed steam during the pack in which it is included. In one embodiment, the value of mux_rate is measured in bytes/second (never zero) and is rounded upward. The value represented in mux_rate is used to define the time of arrival of bytes at the input to the system target decoder. The value encoded in the mux_rate field can vary from pack to pack in an ISO/IEC 11172 multiplexed stream.

At step 440 of FIG. 4, the present invention determines an approximate byte location within the selected audio/video file to perform a first seek in an effort to locate a data packet corresponding to the requested playback time. This approximate byte location is based on the maximum data rate and the requested playback time. The following relationship is used:

$$ABL = \text{rate\_bound (bytes/sec)} \times [RTIME(\text{ticks})/90,000 \text{ (ticks/sec)}]$$

Where ABL is the first approximate byte location based on the rate_bound value and RTIME is the requested playback time (in ticks) as defined above. ABL is an offset byte location within the selected audio/video file. At step 450, the MCI driver 15 executes a seek to command to the determined approximate byte location within the selected audio/video file. A number of seek command formats can be used for step 450 (including a number of well known Microsoft command formats) and the below format is exemplary:

$$\_LSEEK \text{ (File\_Handle, ABL)}$$

Where File_Handle is a name or handle for the selected audio/video file and ABL is the first approximate byte location (a byte offset location within File_Handle) as described above. Processing 400 then continues to FIG. 5.

Figure 5:
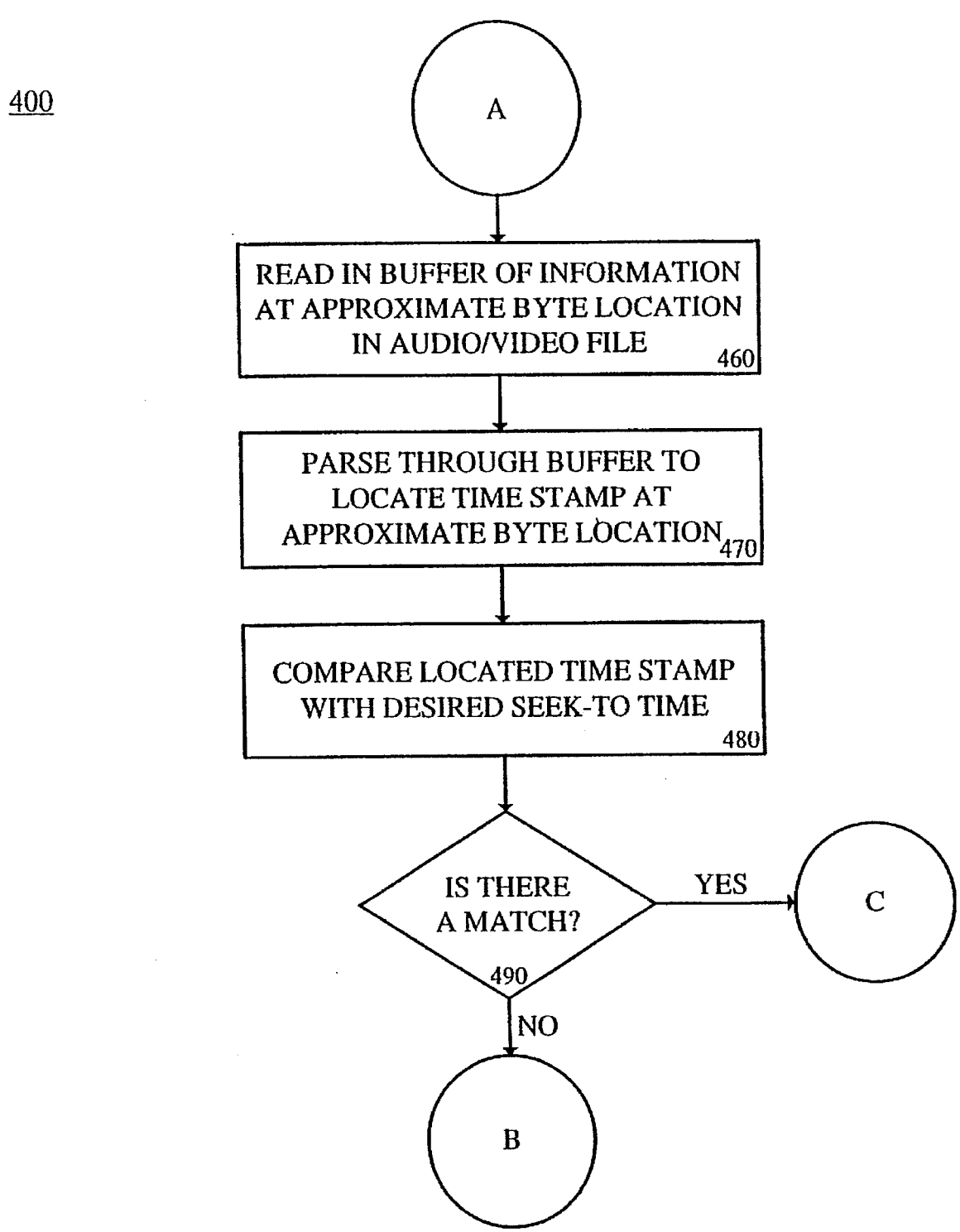
FIG. 5 is a flow diagram illustrating intermediary steps of the seek procedure of the present invention.

With reference to FIG. 5, at step 460, the MCI driver 15 of the present invention then executes a read instruction so that a buffer's worth of MPEG information commencing at the ABL position is read into computer memory (e.g., system memory 65, but can also be stored in storage memory 90). The buffer size is adjustable but in one embodiment is on the order of 150 kbytes in size. A number of read command formats can be used for step 460 (including a number of different well known Microsoft formats) and the format below is exemplary:

$$\_LREAD \text{ (File\_Handle, Buffer\_Handle)}$$

Where Buffer_Handle is the name or handle of the memory buffer that is to contain the data from the read command.

At step 470, the present invention parses through the data stored in the buffer to locate a presentation_time_stamp ("time stamp") near the approximate byte location. The time stamp is a 33 bit binary coded number and represents the intended playback time of the data packet associated with the time stamp and is represented in ticks of the 90 kHz reference clock. At step 470, three locations are searched to locate the first time stamp in the buffer. The first location is within a pack layer just following the pack_start_code. The second and third locations, respectively, are within the audio (code 0010) packet header and video (code 0011) packet header. These fields are well defined in sections 2.4.3.2 and 2.4.3.3 of the ISO/IEC 11172-1 (1993) specification. Once located, the first encountered time stamp is recorded by the MCI driver 15. It is appreciated that step 470 can be performed by the MCI driver 15 or can be performed by the video processor unit 85 under control of the MCI driver 15.

At step 480 of FIG. 5, the MCI driver 15 instructs the playback system 50 to compare the value of the located time stamp of step 470 with the requested playback time (RTIME). Both values are within the MPEG time format (e.g., ticks of the 90 kHz reference clock). At step 490, if the above two time values are within a predetermined tolerance, then a match is indicated and processing flows to label C (FIG. 7). At step 490 of FIG. 5, if no match is determined, then processing flows to label B (FIG. 6).

Figure 6:
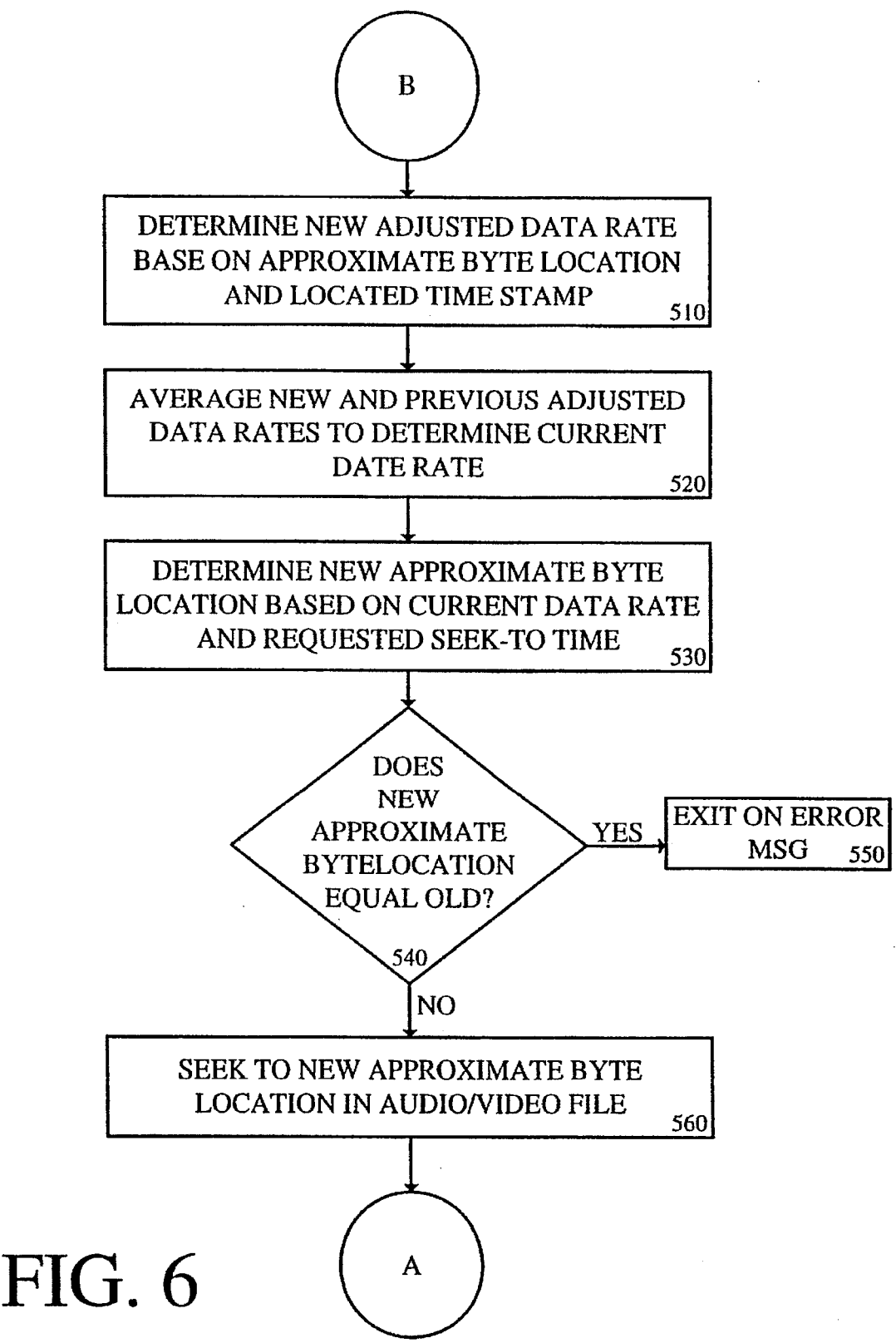
FIG. 6 is a flow diagram illustrating additional intermediary steps of the seek procedure of the present invention.
Figure 7:
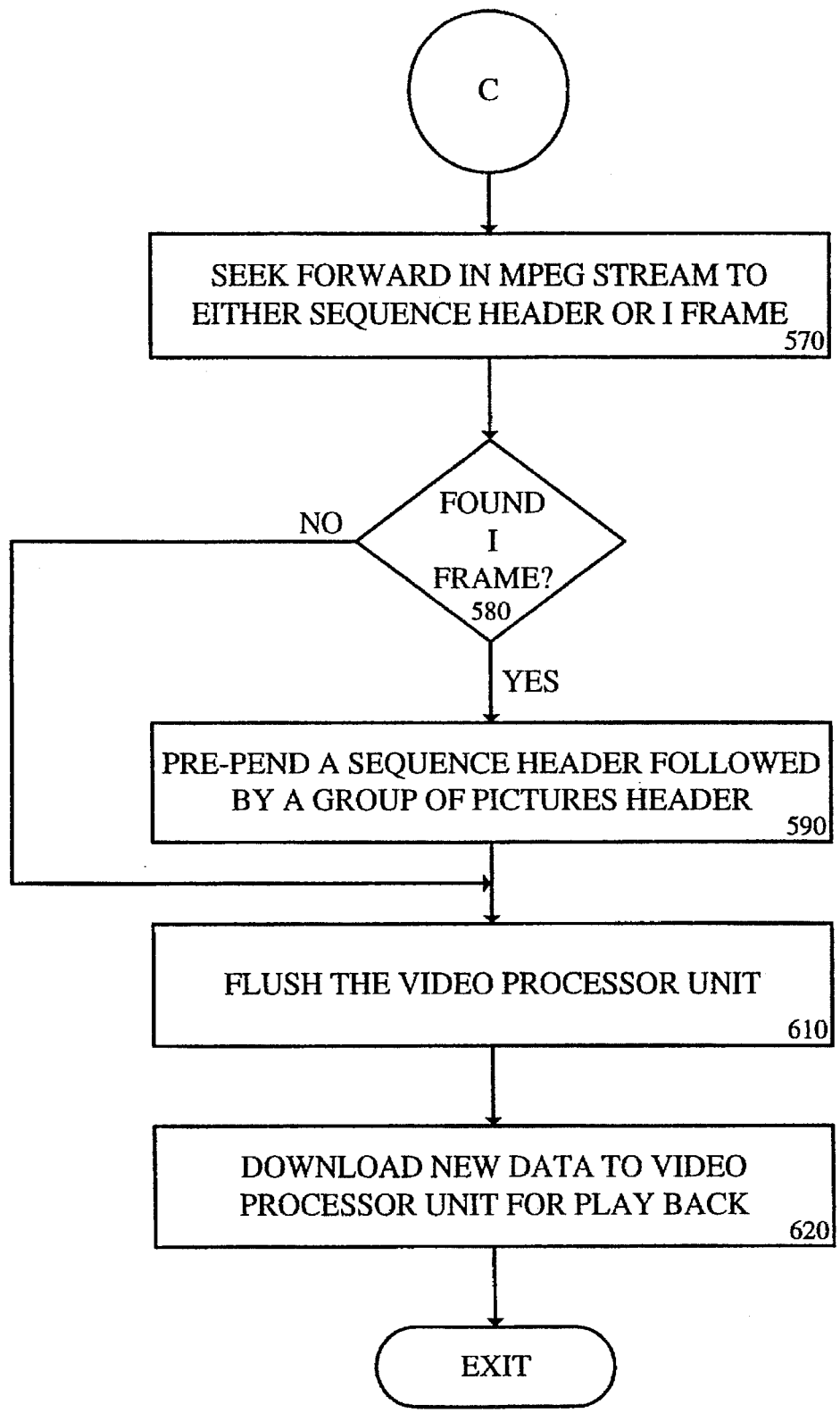
FIG. 7 is a flow diagram illustrating completion steps of the seek procedure of the present invention once a requested playback time match is located.

FIG. 6 illustrates the steps of procedure 400 of the present invention when no match results at step 490. Generally, the steps of FIG. 6 attempt to adjust the data rate based on the current time stamp value, the current approximate byte location, and the old value of the data rate; then a new approximate byte location is determined. Specifically, at step 510, the present invention determines a new data rate based on the approximate byte location (ABL) and the most recently discovered time stamp value. The following relationship is used at step 510:

$$NDR_i(\text{bytes/sec}) = ABL(\text{bytes})/[\text{time stamp value}/90,000]$$

Where $NDR_i$ is the new data rate value in bytes/second for the ith iteration through step 520 before a match is located. At step 520, the MCI driver 15 adjusts the current data rate by averaging the $NDR_i$ value with the previous data rate value (e.g., $NDR_{i-1}$) to obtain a current data rate. The first time process 400 executes through step 520 (e.g., i=1), the previous data rate value (e.g., $NDR_{i-1}$) is the maximum data rate (determined from the rate_bound field at step 430). However, for the second and subsequent times step 520 is executed (i=2 to n), the previous data rate value (e.g., $NDR_{i-1}$) is the NDR value determined by the just previous execution of step 520. The following relationship is used at step 520:

$$CDR_i = [NDR_i + NDR_{i-1}]/2$$

Where $CDR_i$ is the current data rate determined at step 520 for the current iteration, i, through step 520 and is expressed in bytes/second.

At step 530 of FIG. 6, the MCI driver 15 updates the approximate byte location by determining a new approximate byte location based on the current data rate value produced at step 520 and the requested playback time (RTIME). At step 530 the following relationship is used:

$$NABL_i = CDR_i \times [RTIME/90,000 \text{ (ticks/sec)}]$$

Where $NABL_i$ is the new approximate byte location for the current iteration, i, through step 530 and is expressed in bytes.

At step 540 of FIG. 6, the MCI driver determines if the newly determined $NABL_i$ is equal or substantially equal to the just previously determined approximate byte location ($NABL_{i-1}$). Upon the first pass through step 540, the just previously determined approximate location (e.g., $NABL_{i-1}$) is ABL as determined in step 440. Upon the second and subsequent passes through step 540, $NABL_{i-1}$ is taken from the value produced by the last operation of step 530. The following relationship is used at step 540:

$$NABL_i = ? NABL_{i-1}$$

If at step 540 the values, $NABL_i$ and $NABL_{i-1}$, have not substantially changed (e.g., they are the same or within a predetermined tolerance), then process 400 of the present invention exits with an error message via step 550. In this case, the requested playback time was not found and no further updates to the approximate byte location can be made in an effort to locate the requested playback time. In other words, the approximate byte location does not update substantially. In this event, an error message is relayed via playback system 50 to the user and the seek command fails without locating the requested playback time. This can occur if the MPEG data is corrupted or incomplete.

At step 540, if the values, $NABL_i$ and $NABL_{i-1}$, are not the same or not within the predetermined tolerance, then processing flows to step 560 of FIG. 6. At step 560, the MCI driver 15 performs a seek command to a position within the selected audio/video file indicated by the new approximate byte location for the current iteration, i. A number of seek command formats can be used for step 560 and the format below is exemplary:

_LSEEK(File_Handle, $NABL_i$)

Where File_Handle is a name or handle for the selected audio/video file and $NABL_i$ is the new approximate byte location (a byte offset location within File_Handle) for the current iteration, i, that is determined as described above. Processing then returns to label A (e.g., step 460 of FIG. 5) where the present invention determines if the new approximate byte location is a match. If not, another new approximate byte location is determined in another iteration, i, until a match occurs at step 490 (FIG. 5) or until the error condition at step 540 (FIG. 6) is met. Upon each iteration, i, the present invention attempts to get closer to the requested playback time (RTIME) by refining the current data rate.

FIG. 7 illustrates the steps of procedure 400 of the present invention when a match results at step 490 (FIG. 5). Upon step 570 being processed, the portion of the MPEG data corresponding to the required playback time has been located within the buffer of system memory. This MPEG data is now ready to be played back after some initializations are performed. At step 570, beginning at the current approximate byte location, the MCI driver 15 seeks forward through the MPEG data stream (stored in the buffer) until the first of either a sequence header or an I frame (also called I picture) is discovered. The sequence header and the I frame are well known in the art and defined in the above referenced MPEG specifications. At step 580 of the present invention, the MCI driver 15 determines if step 570 located an I frame. If not, processing flows to step 610. If step 570 located an I frame, then processing continues to step 590. At step 590, the MCI driver 15 pre-pends a sequence header onto an outgoing MPEG stream followed by a pre-pending a group-of-pictures header onto the outgoing MPEG stream.

At step 610 of FIG. 7, the video processor unit 85 is flushed by the MCI driver 85 by writing flush bits into the control register 160 (FIG. 3). This prepares the video processor unit 85 for receiving the outgoing MPEG stream. At block 620, the MPEG data located in the selected audio/video file at the requested playback time is then added to the outgoing MPEG stream and the outgoing MPEG stream is then down loaded into the video processor unit 85 for playback. Normal playback is resumed at block 620 and the video processor unit 85 interrupts the MCI driver when its buffer is getting empty. The MCI driver 85 responds by supplying new MPEG data (from the MPEG source 105 of FIG. 2) to the video processor unit 85.

Process 400 of the present invention then exits until a next seek command is received by the MCI driver 15.

The preferred embodiment of the present invention, a method for seeking to a requested playback location within an audio/video file recorded in a variable data rate format, is described. While the present invention has been described in particular embodiments, it should be appreciated that the present invention should not be construed as limited by such embodiments, but rather construed according to the below claims.

What is claimed is:

1. In a digital playback system including a video processor unit and a software driver, a method of seeking to a requested playback time within a selected audio/video file, said method comprising the steps of:

(a) identifying a data rate associated with said audio/video file by accessing a maximum data rate value stored in said audio/video file, said audio/video file recorded in a variable data rate format;

(b) determining an approximate location within said audio/video file based on said data rate and said requested playback time;

(c) identifying an intended playback time stored within data of said audio/video file located near said approximate location;

(d) if said intended playback time does not match said requested playback time, updating said approximate location based on said intended playback time;

(e) repeating steps (c) and (d) until said intended playback time matches said requested playback time.

2. A method as described in claim 1 wherein said variable data rate format is a Motion Picture Expert Group (MPEG) format.

3. A method as described in claim 2 further comprising the steps of:

receiving said requested playback time in units of time or units of frame numbers; and translating said requested playback time into an MPEG time format.

4. A method as described in claim 1 wherein said step (c) identifying the intended playback time stored within data of said audio/video file located near said approximate location comprises the steps of:

seeking within said audio/video file to a byte location identified by said approximate location;

reading an amount of data of said audio/video file beginning near said byte location identified by said approximate location and storing said amount of data into a buffer; and searching said buffer to locate a time stamp, wherein said time stamp indicates said intended playback time associated with said approximate location.

5. A method as described in claim 4 wherein said step of searching said buffer to locate said time stamp comprises the steps of:

searching said buffer to locate a system header comprising said time stamp;

searching said buffer to locate an audio packet header comprising said time stamp; and searching said buffer to locate a video packet header comprising said time stamp.

6. A method as described in claim 1 wherein said step (d) if said intended playback time does not match said requested playback time, updating said approximate location based on said intended playback time comprises the steps of:

(d1) comparing said intended playback time with said requested playback time; and (d2) performing steps (i) and (ii) provided said step (d1) of comparing does not indicate a match;
 (i) adjusting said data rate based on said intended playback time and said approximate location; and
 (ii) updating said approximate location based on said requested playback time and said data rate as adjusted in step (i).

7. A method as described in claim 6 wherein said step (i) adjusting said data rate based on said intended playback time and said approximate location comprises the steps of:

determining a new data rate based on said intended playback time and said approximate location; and averaging said data rate and said new data rate to arrive at an averaged data rate; and referencing said data rate as said averaged data rate.

8. A method as described in claim 1 further comprising the step of terminating said step (e) if said approximate location is not updated substantially.

9. A method as described in claim 1 further comprising the step of downloading data of said audio/video file to said video processor unit beginning at said approximate location, provided said intended playback time matches said requested playback time.

10. In a digital playback system including a video processor unit and a software driver, a method of seeking to a requested playback time within an audio/video file, said method comprising the steps of:

(a) receiving said requested playback time and an identification of said audio/video file, said audio/video file recorded in MPEG format having a variable data rate;

(b) identifying a data rate associated with said audio/video file by locating a maximum data rate value associated with said audio/video file;

(c) determining an approximate byte location within said audio/video file based on said data rate and said requested playback time; (d) identifying an intended playback time within a data packet of said audio/video file located near said approximate byte location;

(e) performing steps (i) and (ii) provided said intended playback time does not match said requested playback time;
 (i) adjusting said data rate based on said intended playback time and said approximate byte location; and
 (ii) updating said approximate byte location based on said requested playback time and said data rate as adjusted in step (i); and (f) repeating steps (d) and (e) until said intended playback time matches said requested playback time or until said approximate byte location is not updated substantially.

11. A method as described in claim 10 wherein said step (d) identifying the intended playback time within said audio/video file associated with said approximate byte location comprises the steps:

seeking within said audio/video file to a byte location identified by said approximate byte location;

reading an amount of information of said audio/video file near said byte location identified by said approximate byte location and storing said amount of information into a buffer; and searching said buffer to locate a time stamp, wherein said time stamp indicates said intended playback time associated with said approximate byte location.

12. A method as described in claim 11 wherein said step of searching said buffer to locate said time stamp comprises the steps of:

searching said buffer to locate a system header comprising said time stamp;

searching said buffer to locate an audio packet header comprising said time stamp; and searching said buffer to locate a video packet header comprising said time stamp.

13. A method as described in claim 10 wherein said step (i) adjusting said data rate based on said intended playback time and said approximate byte location comprises the steps of:

determining a new data rate based on said intended playback time and said approximate byte location; and averaging said data rate and said new data rate to arrive at an averaged data rate; and referencing the data rate as said averaged data rate.

14. A method as described in claim 10 wherein said step of receiving said requested playback time comprises the steps of:

receiving said requested playback time in units of time or units of frame numbers; and translating said requested playback time into an MPEG time format.

15. A method as described in claim 10 further comprising the step of downloading data of said audio/video file to said video processor unit beginning at said approximate byte location, provided said intended playback time matches said requested playback time.

16. A computer controlled playback system having a central processing unit, and a system memory both coupled to a bus, said system memory having computer readable program code stored therein for causing said system to seek to a requested playback time within an audio/video file, said program code comprising:

(a) program code for identifying a data rate by locating a maximum data rate value stored in said audio/video file, said audio/video file recorded in MPEG format having a variable data rate;

(b) program code for determining an approximate byte location within said audio/video file based on said data rate and said requested playback time;

(c) program code for locating an intended playback time stored within a data packet of said audio/video file located near said approximate byte location;

(d) program code for determining if said intended playback time matches said requested playback time, and upon no match:
 (i) program code for adjusting said data rate based on said intended playback time and said approximate byte location; and (ii) program code for updating said approximate byte location based on said requested playback time and said data rate as adjusted above; and (e) program code for repeating program codes (c) and (d) until said intended playback time matches said requested playback time or until said approximate byte location is not updated substantially.

17. A system as described in claim 16 wherein said program code (c) comprises:

program code for seeking within said audio/video file to a byte location identified by said approximate byte location;

program code for reading an amount of information of said audio/video file near said byte location into a buffer of said system memory; and program code for searching said buffer to locate a time stamp, wherein said time stamp indicates said intended playback time associated with said approximate byte location.

18. A system as described in claim 16 wherein said program code for searching said buffer to locate said time stamp comprises:

program code for searching said buffer to locate a system header comprising said time stamp;

program code for searching said buffer to locate an audio packet header comprising said time stamp; and program code for searching said buffer to locate a video packet header comprising said time stamp.

19. A system as described in claim 16 wherein said program code (i) for adjusting said data rate based on said intended playback time and said approximate byte location comprises:

program code for determining a new data rate based on said intended playback time and said approximate byte location; and program code for averaging said data rate and said new data rate to arrive at an averaged data rate; and program code for referencing said data rate as said averaged data rate.

20. A system as described in claim 16 further comprising program code for downloading data of said audio/video file to a video processor unit beginning at said approximate byte location, provided said intended playback time matches said requested playback time.

* * * * *